United States Patent
Harpur et al.

(10) Patent No.: US 9,894,120 B2
(45) Date of Patent: Feb. 13, 2018

(54) PARTIAL LIKES OF SOCIAL MEDIA CONTENT

(71) Applicant: International Business Machines Corporation, Armonk, NY (US)

(72) Inventors: Liam S. Harpur, Dublin (IE); David G. Robinson, Cary, NC (US); Eric M. Woods, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 14/616,352

(22) Filed: Feb. 6, 2015

(65) Prior Publication Data
US 2016/0234266 A1    Aug. 11, 2016

(51) Int. Cl.
| | |
|---|---|
| G06F 3/0482 | (2013.01) |
| H04L 29/06 | (2006.01) |
| H04L 12/58 | (2006.01) |
| G06F 3/0481 | (2013.01) |
| G06F 17/30 | (2006.01) |
| H04L 29/08 | (2006.01) |

(52) U.S. Cl.
CPC .......... *H04L 65/403* (2013.01); *G06F 3/0482* (2013.01); *G06F 3/04817* (2013.01); *G06F 17/3089* (2013.01); *H04L 51/32* (2013.01); *H04L 67/02* (2013.01)

(58) Field of Classification Search
CPC ............................. G06F 2/0482; G06F 3/0482
USPC ......................................................... 715/753
See application file for complete search history.

(56) References Cited

U.S. PATENT DOCUMENTS

| | | | | |
|---|---|---|---|---|
| 7,783,622 B1* | 8/2010 | Vandermolen | .... | G06F 17/30867 707/708 |
| 8,341,223 B1 | 12/2012 | Patton et al. | | |
| 8,352,573 B2* | 1/2013 | Chandra | ........... | G06F 17/30899 709/218 |
| 8,893,030 B1* | 11/2014 | Anderson | ............. | G06F 3/0483 715/764 |
| 9,619,109 B2* | 4/2017 | Vandermolen | ........ | G06F 3/0482 |
| 2006/0048046 A1* | 3/2006 | Joshi | ..................... | G06F 17/241 715/230 |

(Continued)

OTHER PUBLICATIONS

Ida Tsang, "Chapter 22 Facebook Like", available at <<https://confluence.radicasys.com/display/RI310/Chapter+22+Facebook+Like>>, available on Apr. 24, 2013, 7 pages.*

(Continued)

*Primary Examiner* — William Bashore
*Assistant Examiner* — Daniel Rodriguez
(74) *Attorney, Agent, or Firm* — Lee Law, PLLC; Christopher B. Lee

(57) ABSTRACT

A portion of content within a social network content post indicated as liked by a social network user is identified responsive to receiving an indication from the social network user that the social network user likes content within the social network content post. A partial-like indication is generated, in association with the social network content post, that facilitates rendering of the partial-like indication with the portion of the content within the social network content post. The content is provided with the generated partial-like indication responsive to a client browser application request to render the content.

17 Claims, 6 Drawing Sheets

(56) References Cited

U.S. PATENT DOCUMENTS

| | | | |
|---|---|---|---|
| 2011/0029512 A1 | 2/2011 | Folgner et al. | |
| 2011/0106630 A1* | 5/2011 | Hegeman | G06Q 30/02 705/14.71 |
| 2012/0005224 A1* | 1/2012 | Ahrens | G06Q 10/10 707/769 |
| 2012/0136937 A1 | 5/2012 | Fischer et al. | |
| 2012/0191715 A1* | 7/2012 | Ruffner | G06F 17/30867 707/738 |
| 2012/0209841 A1* | 8/2012 | Saretto | G06F 17/218 707/736 |
| 2012/0303722 A1* | 11/2012 | Richter | G06Q 50/01 709/206 |
| 2013/0060858 A1 | 3/2013 | Freishtat et al. | |
| 2013/0097481 A1* | 4/2013 | Kotler | G06F 17/241 715/230 |
| 2013/0198652 A1* | 8/2013 | Dunn | G06F 3/0484 715/751 |
| 2013/0325954 A1* | 12/2013 | Cupala | G06F 3/041 709/204 |
| 2014/0067828 A1* | 3/2014 | Archibong | H04L 65/4084 707/748 |
| 2014/0068433 A1* | 3/2014 | Chitturi | H04N 21/41407 715/716 |
| 2014/0074855 A1* | 3/2014 | Zhao | G06F 17/3002 707/746 |
| 2014/0122991 A1* | 5/2014 | Achillopoulos | G06F 17/2785 715/230 |
| 2014/0173461 A1* | 6/2014 | Shahade | H04L 65/403 715/753 |
| 2014/0215351 A1* | 7/2014 | Gansca | G06Q 50/01 715/751 |
| 2014/0325333 A1* | 10/2014 | Evans | H04N 21/23109 715/230 |
| 2015/0205492 A1* | 7/2015 | Nobil | G06F 17/3005 715/716 |
| 2015/0242063 A1* | 8/2015 | Lindo | G06F 3/0481 715/753 |
| 2015/0278239 A1* | 10/2015 | Colt | H04L 67/22 707/693 |
| 2015/0326688 A1* | 11/2015 | Aarnio | G06F 17/30029 707/748 |
| 2015/0332335 A1* | 11/2015 | Abraham | G06Q 50/00 705/14.44 |
| 2015/0341452 A1* | 11/2015 | Li | G06Q 50/01 709/204 |
| 2015/0379522 A1* | 12/2015 | Huynh | G06Q 30/018 705/317 |
| 2016/0028830 A1* | 1/2016 | Coglitore | H04L 67/2842 709/213 |
| 2016/0191446 A1* | 6/2016 | Grol-Prokopczyk | G06F 3/04817 709/206 |

OTHER PUBLICATIONS

Quora.com, "Venture Capital: What metrics do VCs look for in early stage companies?", available at <<https://www.quora.com/Venture-Capital-What-metrics-do-VCs-look-for-in-early-stage-companies>>, avialable on Jan. 4, 2011, 6 pages.*

Ida Tsang, "Chapter 22 Facebook Like", avialable at <<https://confluence.radicasys.com/display/RI310/Chapter+22+Facebook+Like>>, available on Apr. 24, 2013, 9 pages.*

Quora.com, "Venture Capital: What metrics do VCs look for in early stage companies?", available at <<https://www.quora.com/Venture-Capital-What-metrics-do-VCs-look-for-in-early-stage-companies>>, avialable on Jan. 4, 2011, 8 pages.*

Author Unknown, Facebook Like Button: Like Button for the Web, Webpage/site, Printed from website on Nov. 5, 2014, pp. 1-4, Facebook, Published online at: https://developers.facebook.com/docs/plugins/like-button.

* cited by examiner

PARTIAL LIKES OF SOCIAL MEDIA CONTENT

BACKGROUND

The present invention relates to sharing social media content. More particularly, the present invention relates to partial likes of social media content.

Social networks allow users to interact within a shared web-based platform. Social network users may post photographs, stories, articles, and may communicate using the social network.

BRIEF SUMMARY

A method includes, by a processor: identifying a portion of content within a social network content post indicated as liked by a social network user responsive to receiving an indication from the social network user that the social network user likes content within the social network content post; generating, in association with the social network content post, a partial-like indication that facilitates rendering of the partial-like indication with the portion of the content within the social network content post; and providing the content with the generated partial-like indication responsive to a client browser application request to render the content.

A system that performs the method and a computer program product that causes a computer to perform the method are also described.

DETAILED DESCRIPTION

Figure 1:
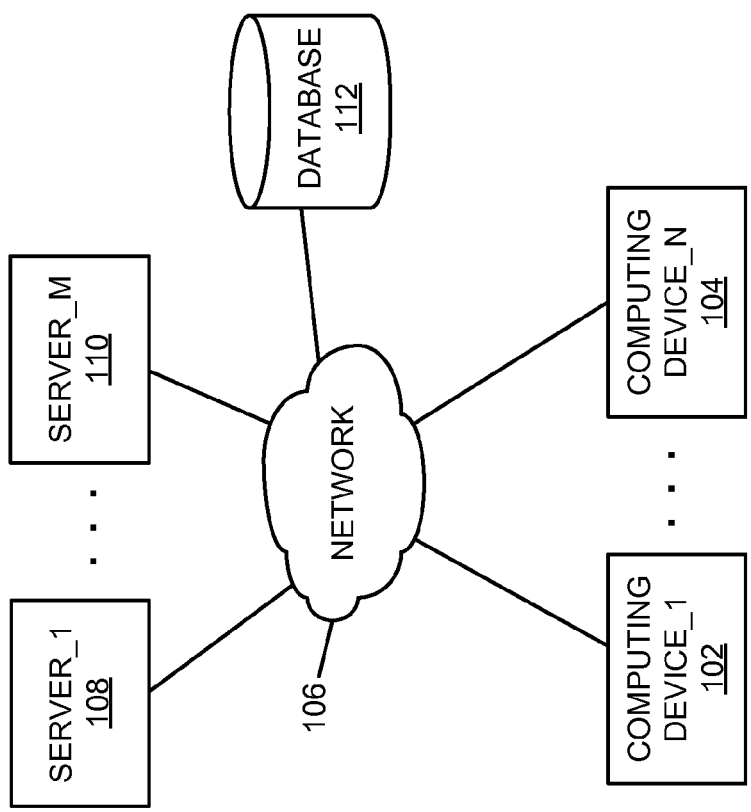
FIG. 1 is a block diagram of an example of an implementation of a system for partial likes of social media content according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides partial likes of social media content. The present technology solves a recognized social network content sharing problem by providing technology that includes a new form of social network computing devices that allows users to designate portions of lengthy social network postings/content that are liked for propagation within complex social network computing environments. Users of the present technology may designate a "partial like" of the portion of content within a lengthy post in a social network, such as text (e.g., a sentence, paragraph, etc.), images, portions of audio streamed with the content, or other granular aspects of posted content. Several options are available as described below for user selection/specification and alternatively for programmatic inference of the particular portion of the content that is liked. Once identified, the designated portion of the lengthy post may be tagged as being liked rather than the entire post. The partial like may be propagated throughout the social network in a variety of ways as described below and identified for other social network users to allow the other users to recognize and identify the particular portion of the lengthy post that the user likes. As such, the present technology removes the general ambiguity associated with conventional technologies that specify an entire posting as being liked or disliked by social network users.

It should be noted that the term "partial like" as used herein refers to a like of a portion of content, and does not refer to marginally liking content. As such, a partial like of content specifies a sub-section/portion (e.g., a sentence, phrase, table, image, etc.) of larger content that is liked by a social network user, and that the social network user wants to document as worthwhile reading/viewing for other social network users, while omitting suggestions to read other portions of the content.

Two primary categories of identification of the partial like of content are described herein. A first primary category is user specification of the particular portion of the content that is liked. The second primary category is programmatic inference of the particular portion of the content that is liked.

There are also several options for propagation of the information that identifies the tagged portion of content that is partially liked. For example, "partial like properties" or metadata may be associated with the tagged content/file and/or with the particular tagged portion of the content. These properties may be retrieved with the content (e.g., with a markup language file) and interpreted by a client browser plugin. The properties may be implemented as a script or otherwise as appropriate for a given implementation. The client browser plugin may utilize the properties to overlay/mask one or more graphic images over or near a representation of the liked portion of the content within the browser, to highlight the respective liked portion, and/or to designate the liked portion as partially liked with a count of the number of social network users that also liked the particular portion of content. Alternatively, the markup language itself may be dynamically modified to cause the browser itself to render the content with markups and/or graphic images, in-line highlights, and/or to designate the liked portion as partially liked with a count of the number of social network users that also liked the particular portion of content. As another alternative, the partially liked portion of the content may be rendered in an activity stream on the user's screen.

Regarding the user specification of the particular portion of the content that is liked, the users may specify the partial like in a variety of ways. For example, the user may select/highlight a portion of lengthy content, and then select a "like" indication/button either at the page level or via a pop-up menu. Alternatively, the user may drag the highlighted content portion onto the like button using a mouse/cursor. Within one of these implementation options, the selection of the portion of content may be recognized and the portion of the content tagged as being liked rather than the entire content post.

Alternatively, regarding the programmatic inference of the particular portion of the content that is liked, the present technology may programmatically ascertain which sentence or paragraph of displayed content that the user is looking at is the portion of the lengthy post the user likes (e.g., by use of eye tracking technology, by inferring that a sentence or paragraph is centrally rendered on a display, etc.). As an additional alternative, social network user partial likes of social contacts of a particular user may be statistically leveraged to infer that the user liked a particular portion of the lengthy content post. This alternative operates with a premise that social network contacts may be friends or coworkers interested in the same types of subject matter. Within this alternative, where a user specifies a "like" at a page level and multiple paragraphs for example are rendered and in view on the display, if one or more of the user's social network contacts has also specified a subset of the rendered portions of the content as being partially liked, the present technology may statistically infer based upon quantities of similar partial likes entered by the other social network contacts that the user also likes the same portion of the lengthy content rather than a different portion (e.g., by inference based upon similarity of interests). As with other implementation alternatives, the inferred portion of the content that is partially liked may be tagged as being liked rather than the entire post.

The user that selects the like may also be provided with an opportunity to review, update, and/or override the inferred portion of content that is to be distributed as a partial like. This aspect of user feedback for partial likes may further improve efficiency for a user and provide more certainty that inferred partial likes accurately convey the user's intentions. Further, an inference module of a computing device may learn over time from the user feedback regarding accuracy of inferred partial likes, and the use of user feedback may further improve accuracy of a partial like inference engine over time.

Regarding rendering of the "partial like" to indicate the respective portion of content to other social network users, when a portion of content has been tagged as being liked, this indication may be propagated in a social network such that when other users view the content, the respective portions may be indicated with a pop-up graphic as being liked with a count of how many users like the particular portion of content (e.g., an icon with a "P," with a thumbs-up symbol, and with a count of the number of partial likes).

Additionally, partial-like thresholds may be implemented where the system maintains the partial likes (e.g. partial-like properties or dynamically-modified markup language code) in a transparent manner until a threshold of "proximity" partial likes are asserted. Proximity partial likes may be considered as partial likes that specify the same area of lengthy content, such that even if the partial likes are not exact, there is at least overlap or general proximity for the partial likes (e.g., different partial likes within the same paragraph). Where a partial-like threshold (e.g., five (5), ten (10), etc.) of proximate partial likes have been recorded, the system may propagate the partial likes throughout the social network in accordance with satisfaction of the particular partial-like threshold.

Users may also define or utilize existing sub-groups of users within a social network for distribution of partial likes. For example, sub-groups of work colleagues, friends in a recreational activity club, or other social network groups may be defined/utilized. A distribution set for partial likes may be formed using these social network sets of users.

It should be noted that conception of the present subject matter resulted from recognition of certain limitations associated with "likes" of content in social networks. It was observed that prior technologies for communication of likes are limited to page level indications (e.g., webpage-level likes). However, it was recognized that the webpage-level likes may result in ambiguity regarding what was liked by other social network users. For example, it was observed that often a group of work colleagues are involved in product development and share ideas and research on topics related to their work by following each other's posts in a social network. Within this context, it was observed that if a particular webpage/post that is related to a topic is general in nature for the first several paragraphs, but provides an interesting technical contribution several paragraphs into the article (e.g., a sentence or line of the post), there is no way using prior technologies for a user to identify the particular portion that provides the technical contribution of interest to the group. Using these prior technologies, it was further observed that the user's social network colleagues (e.g., followers) may be confused regarding why the webpage/post was "liked" given that most of the content is general in nature, and the colleagues may never read the portion of the content that provides the technical contribution of interest. It was determined that a technical solution to this problem may be implemented as a "partial like" that allows users to granularly select portions of a webpage/post to clarify the portion that is partially liked. The present technology provides such a solution as a set of mechanisms by which to granularly specify and identify portions of content that are partially liked. The present subject matter improves communication of which portions of lengthy webpages/posts are liked by users by providing for partial likes of social media content, as described above and in more detail below. As such, improved reduced ambiguity regarding which portions of content are liked, improved efficiency by which users may share ideas, and increased productivity by use of social network platforms for information sharing may be obtained through use of the present technology.

The partial likes of social media content described herein may be performed in real time to allow prompt recognition and distribution of information related to partial likes of lengthy content within social networks. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for partial likes of social media content. A computing device_1 102 through a computing device_N 104 communicate via a network 106 with several other devices. The other devices include a server_1 108 through a server_M 110. The computing device_1 102 through the computing device_N 104 and the server_1 108 through the server_M 110 may also access a database 112.

As will be described in more detail below in association with FIG. 2 through FIG. 5, the computing device_1 102 through the computing device_N 104 and the server_1 108 through the server_M 110 may each provide automated partial likes of social media content. The automated partial likes of social media content is based upon identification of portions of content that are liked by a particular social network user (e.g., by either user specification/selection or inference). The automated partial likes of social media content may be propagated to other social network users to improve communication regarding which portions of content are liked. As such, the present technology may be implemented at a user computing device or server device level, or by a combination of such devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a social network server, web server, application server, or other data server device.

The database 112 may store content in association with one or more social networks. The database 112 may also store either partial-like properties or dynamically-modified markup language code, as appropriate for a given implementation and a particular piece of content. The database 112 may include a relational database, an object database, or any other storage type of device. As such, the database 112 may be implemented as appropriate for a given implementation.

Figure 2:
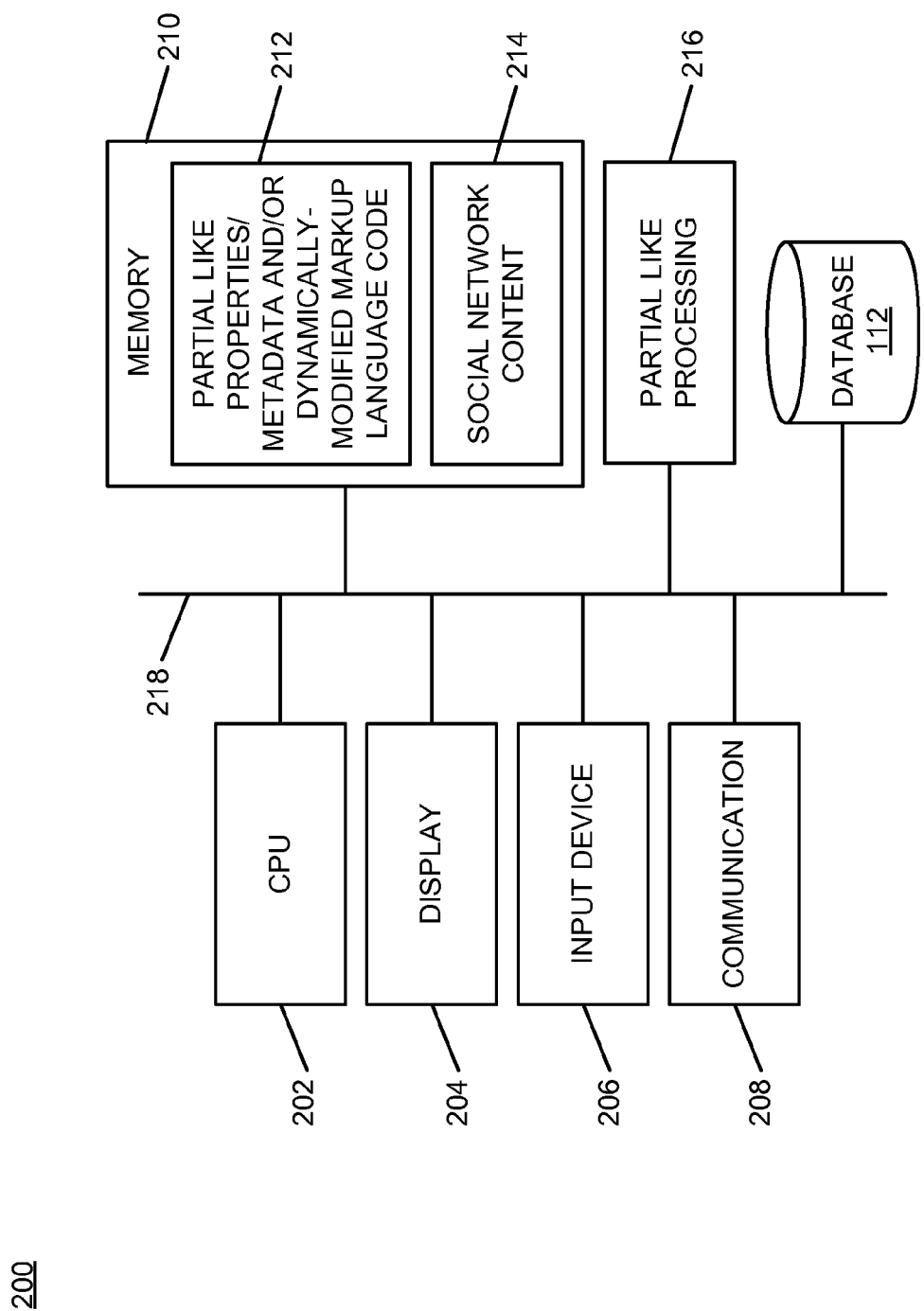
FIG. 2 is a block diagram of an example of an implementation of a core processing module capable of performing partial likes of social media content according to an embodiment of the present subject matter.

FIG. 2 is a block diagram of an example of an implementation of a core processing module 200 capable of performing partial likes of social media content. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of partial likes of social media content in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a partial like properties/metadata and/or dynamically-modified markup language code storage area 212 that stores indications of partial likes based upon the particular implementation and the particular piece of content processed by the core processing module 200. The memory 210 also includes a social network content storage area 214 that stores original/unmodified social network content processed by the core processing module 200. It is understood that the memory 210 may also include a browser application and execution space when the core processing module is associated with a client device, such as one of the computing device_1 102 through the computing device_N 104.

The memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A partial like processing module 216 is also illustrated. The partial like processing module 216 provides processing to identify and render partial likes of content for the core processing module 200, as described above and in more detail below. The partial like processing module 216 implements the automated partial likes of social media content of the core processing module 200. It should also be noted that the partial like processing module 216 may further implement a component to perform eye tracking and a camera as appropriate for the given implementation for use in inference of liked portions of content.

It should further be noted that the partial like processing module 216 may form a portion of other circuitry described without departure from the scope of the present subject matter. Additionally, the partial like processing module 216 may alternatively be implemented as an application stored within the memory 210. In such an implementation, the partial like processing module 216 may include instructions executed by the CPU 202 for performing the functionality described herein. The CPU 202 may execute these instructions to provide the processing capabilities described above and in more detail below for the core processing module 200. The partial like processing module 216 may form a portion of an interrupt service routine (ISR), a portion of an operating system, a portion of a browser application, or a portion of a separate application without departure from the scope of the present subject matter.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the partial like processing module 216, and the database 112 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
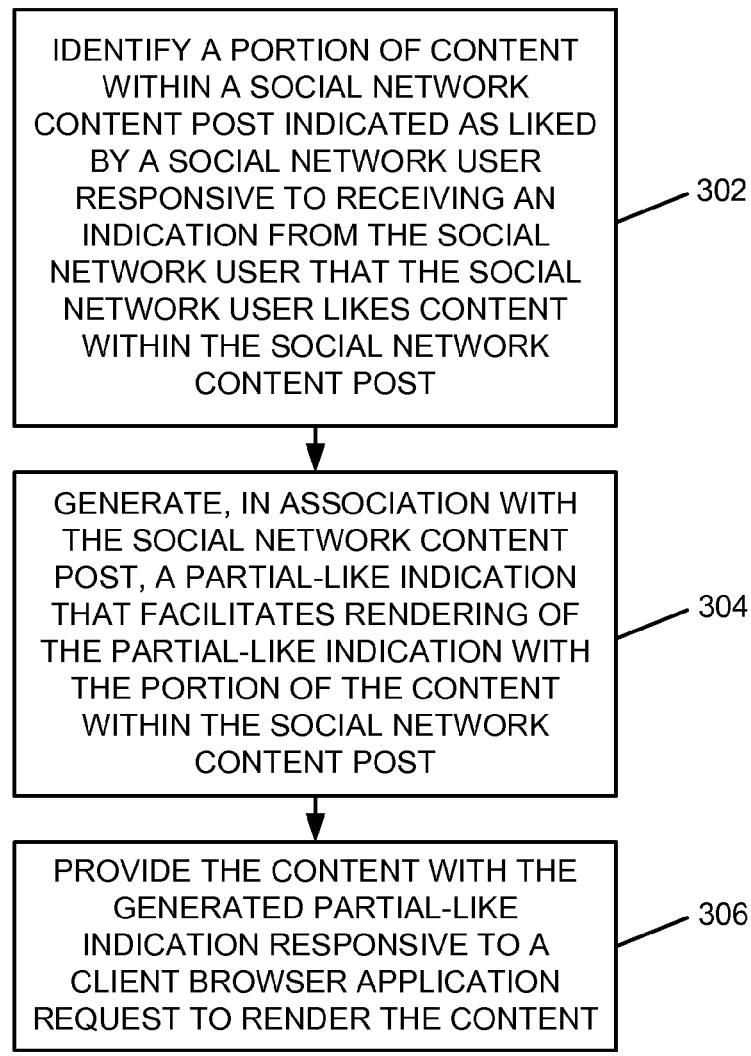
FIG. 3 is a flow chart of an example of an implementation of a process for partial likes of social media content according to an embodiment of the present subject matter.
Figure 4A:
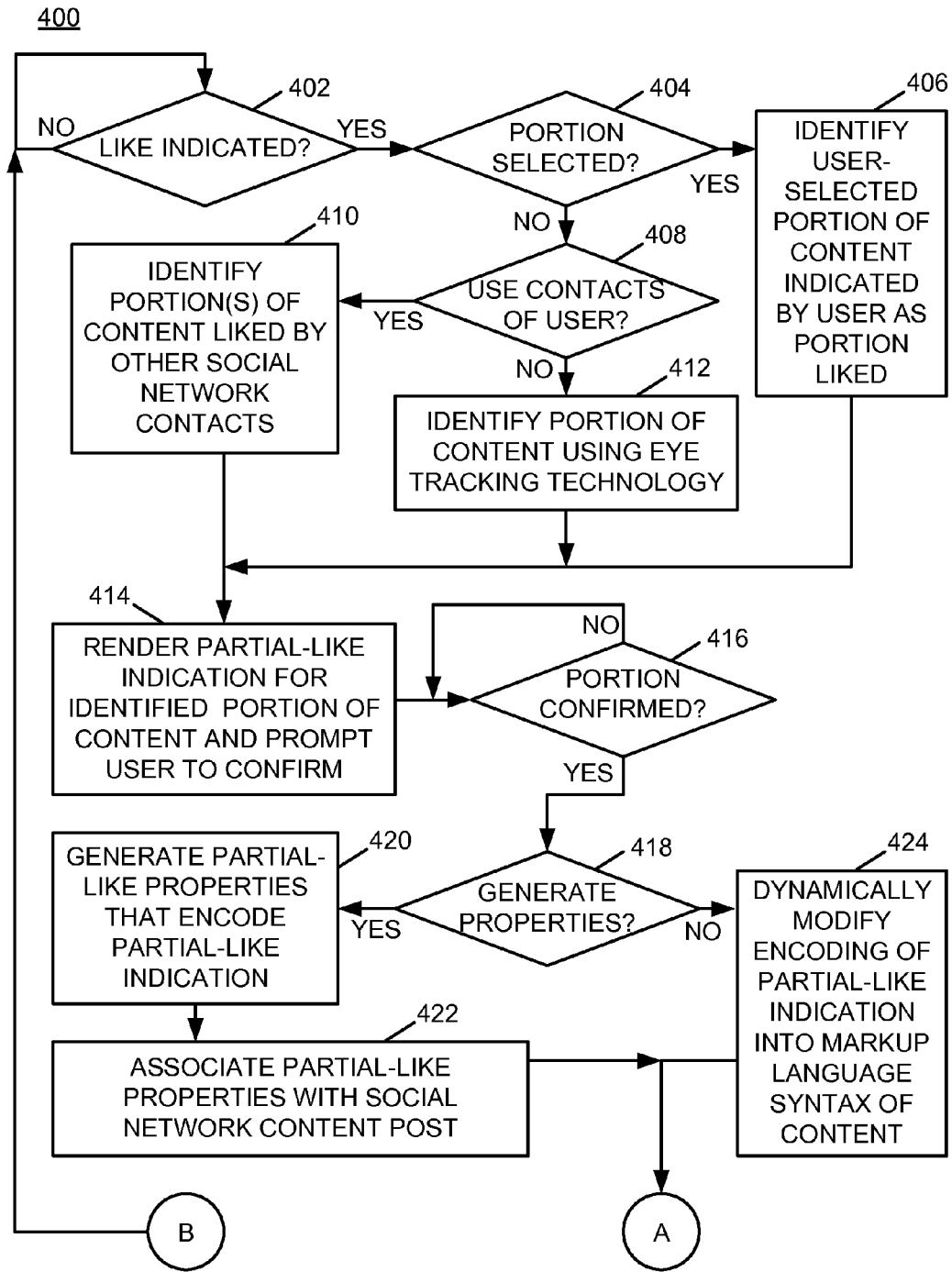
FIG. 4A is a flow chart of an example of an implementation of initial processing within a process for performing partial likes of social media content using either partial-like properties or dynamic markup language modification according to an embodiment of the present subject matter.
Figure 4B:
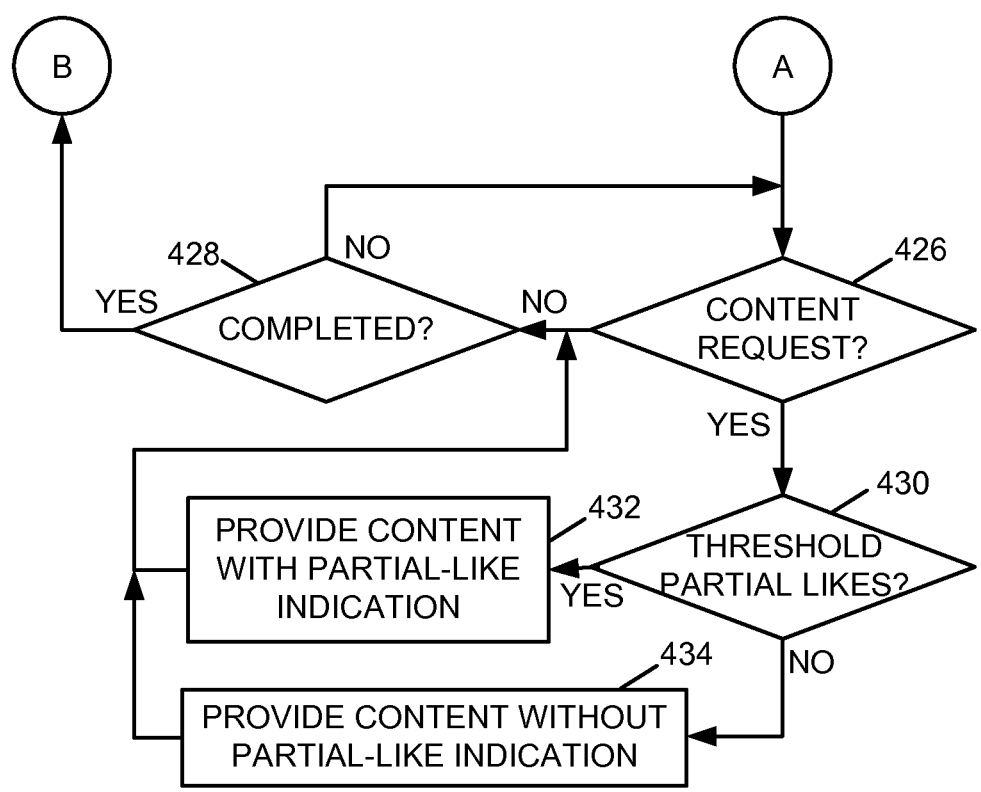
FIG. 4B is a flow chart of an example of an implementation of additional processing within a process for performing partial likes of social media content using either partial-like properties or dynamic markup language modification according to an embodiment of the present subject matter.

FIG. 3 through FIG. 4B described below represent example processes that may be executed by devices, such as the core processing module 200, to perform the automated partial likes of social media content associated with the present subject matter. Many other variations on the example processes are possible and all are considered within the scope of the present subject matter. The example processes may be performed by modules, such as the partial like processing module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for partial likes of social media content. The process 300 represents a computer-implemented method of performing the partial likes of social media content described herein. At block 302, the process 300 identifies a portion of content within a social network content post indicated as liked by a social network user responsive to receiving an indication from the social network user that the social network user likes content within the social network content post. At block 304, the process 300 generates, in association with the social network content post, a partial-like indication that facilitates rendering of the partial-like indication with the portion of the content within the social network content post. At block 306, the process 300 provides the content with the generated partial-like indication responsive to a client browser application request to render the content.

FIGS. 4A-4B illustrate a flow chart of an example of an implementation of a process 400 for performing partial likes of social media content using either partial-like properties or dynamic markup language modification. The process 400 represents a computer-implemented method of performing the processing associated with detecting and providing partial likes of content as described herein. FIG. 4A illustrates initial processing within the process 400.

It should be noted that the process 400 may be implemented either at a server device or at a client computing device, and that any adjustments based upon the respective location of processing may be implemented as they are appropriate for the given implementation. The present description further presumes that content of a social media post has been either delivered to a client computing device or rendered by client computing device. At decision point 402, the process 400 makes a determination as to whether a "like" of content associated with a social network content post has been indicated by a user. The "like" of the content may be indicated in a variety of ways. For example, the "like" may be indicated by the user entering a page-level like, either with or without a portion of content selected. Alternatively, the "like" may be indicated using a pop-up menu operation, again either with or without user selection of a portion of content, and a selection of a "partial-like" pop-up menu option. The processing described herein addresses all of these event types, either by inference of a like portion where the user has not selected a portion of the content, or by identification of a selected portion where a portion has been selected under one of the event options described above. The like indication may be detected by a client browser application and processed locally, or may be received by a server from a client browser application and processed at the server, again as appropriate for the given implementation.

In response to determining at decision point 402 that a like of content associated with a social network content post has been indicated by a user, the process 400 makes a determination at decision point 404 as to whether the user has selected a portion of content and has entered one of a page-level like or a partial like pop-up menu selection, or alternatively, whether to infer the portion of the content indicated as liked. It should be noted that in certain implementations, the user may select/highlight a portion of rendered content and select either a page-level like button, or may right-click a mouse and a pop-up menu may present an option to "partially-like" the content portion selected/highlighted. Alternatively, the process 400 may implement processing to infer the portion of the content that is liked without requiring user selection and user identification of the liked portion of the content. Each of these processing options may be implemented as illustrated in the same process to provide flexibility for the user.

Describing a first branch of processing, in response to determining at decision point 404 that the user selected a portion of content and entered one of a page-level like or a partial like pop-up menu selection, the process 400 identifies the user-selected portion of the content indicated by the user as a portion of the content that is liked at block 406. Alternatively, in response to determining at decision point 404 to infer the portion of the content indicated as liked, at decision point 408 the process 400 makes a determination as to whether to use social network contacts and any partial likes issued by those contacts to infer the content portion liked by the user, or alternatively, whether to use eye tracking technology to determine what portion of rendered content the user is presently reading/viewing.

In response to determining at decision point 408 to use social network contacts and any partial likes issued by those contacts to infer the content portion liked by the user, the process 400 identifies any portion(s) of the same content that have been liked (partial like) by other social network contacts of the user at block 410. As such, the process 400 may infer the portion of the content within the social network content post liked by the social network user based upon other partial-like indications associated with the content generated by other social network contacts of the social network user. It should be noted that where more than one social network contact has also liked a portion of the same social network content post, the portions may not be identical, but may be proximate/near one another and may overlap. The process 400 may form unions and/or intersections of different partially-liked portions and provide these to the user for consideration and approval, as described in more detail below. Alternatively, in response to determining to use eye tracking technology to determine what portion of rendered content the user is presently reading/viewing at decision point 408 (i.e., not to use social network contacts and any partial likes issued by those contacts), the process 400 identifies the portion of content being viewed using eye tracking technology, as described above, at block 412.

In response to either inferring the content portion liked by the user using social network contacts at block 410, in response to inferring the content portion liked by the user using eye tracking technology at block 412, or in response to identifying the user-selected portion of the content indicated by the user as a portion of the content that is liked at block 406, the process 400 renders a partial-like indication for the identified portion of the content in conjunction with the rendered content, and prompts the user to confirm to intended portion at block 414. It should be noted that the user may adjust the indicated portion of the content to refine automated identification of the content portion. The partial like indication may be rendered, for example, as illustrated and described in association with FIG. 5 below.

At decision point 416, the process 400 makes a determination as to whether the user has finalized any changes to the identified partial-like segment of the content and has confirmed the indicated portion of the content to be published as partially-liked by the user within the social network. In response to determining that the user has confirmed the indicated portion of the content to be published as partially-liked by the user within the social network, at decision point 418 the process 400 begins processing to determine how to generate, in association with the social network content post, a partial-like indication that facilitates rendering of the partial-like indication with the portion of the content within the social network content post. For example, as described above and in more detail below, the process 400 may generate partial-like properties or may dynamically modify the markup language content of the social network content post itself to associate the partial-like indication with the social network content post. As such, the process 400 makes a determination as to whether to generate partial-like properties to associate with the social network content post, or alternatively, whether to dynamically modify the markup language content of the social network content post itself.

In response to determining to generate partial-like properties to associate with the social network content post at decision point 418, the process 400 generates partial-like properties (metadata) that encode a partial-like indication for the social network content post at block 420. The partial-like properties may identify the portion of the content (e.g., paragraph, sentence, table, etc.) and may identify preferred identifiers to be used to depict the partial like. At block 422, the process 400 associates the partial-like properties with the social network content post. The partial-like properties may be associated with the social network content post, for example, within the database 112 or otherwise as appropriate for a given implementation.

Returning to the description of decision point 418, in response to determining to dynamically modify the markup language content of the social network content post itself (i.e., not to create partial-like properties to associate with the social network content post), the process 400 dynamically modifies encoding of the partial-like indication into the markup language syntax of the content at block 424. Dynamic modification of the encoding of the partial like indication may include encoding highlights, graphics, or other features, such as those illustrated and described in association with FIG. 5 below.

In response to associating the partial-like properties with the social network content post at block 422, or in response to dynamically modifying the markup language content of the social network content post itself at block 424, the process 400 transitions to the processing shown and described in association with FIG. 4B.

FIG. 4B illustrates additional processing associated with the process 400 for performing partial likes of social media content using either partial-like properties or dynamic markup language modification. At decision point 426, the process 400 makes a determination as to whether a content request has been detected. As described above, the process 400 may be implemented by a server or by a client device, and appropriate differences in processing may be implemented. For example, the determination at decision point 426 may be either a client browser application detection of a user request to retrieve and render content, or may be a server application receiving a request for content from a client application. Within either implementation, in response to determining that a content request has not been detected, the process 400 makes a determination at decision point 428 as to whether processing is completed as part of higher-level iterative processing. In response to determining at decision point 428 that processing is not completed, the process 400 returns to decision point 426 and iterates as described above.

Returning to the description of decision point 426, in response to determining that a content request has been detected, the process 400 makes a determination at decision point 430 as to whether a threshold number of partial likes has been indicated in association with the social network content post. As described above, a partial-like threshold may be implemented such that likes of portions of content are rendered to the user only after a configured number of users have specified likes of portions of content. It should be noted that the partial-like threshold may be omitted or set to zero (0) to allow all partial likes to be rendered. An example of content rendered with a partial-like indication is illustrated and described below in association with FIG. 5.

In response to determining at decision point 430 that the threshold number of partial likes has been indicated in association with the social network content post, the process 400 provides the content with the partial-like indication at block 432. Alternatively, in response to determining at decision point 430 that the threshold number of partial likes has not been indicated in association with the social network content post, the process 400 provides the content without the partial-like indication at block 434.

In response to either providing the content with the partial-like indication at block 432, or in response to providing the content without the partial-like indication at block 434, the process 400 returns to decision point 428 and iterates as described above to determine whether processing is completed and/or whether to process additional content requests until processing is completed. In response to determining at decision point 428 that processing is completed, the process 400 returns to the processing described in association with FIG. 4A at decision point 402 and iterates as described above.

As such, the process 400 provides technology that allows users to specify portions of content that are liked, and also infers portions of content that are liked. The process 400 further either generates partial-like properties for the content or dynamically modifies the markup language itself. The process 400 also processes requests for content and provides either content with partial-like indications or without partial-like indications, and this determination may be based upon a configured threshold of partial-like indications, as appropriate for the given implementation.

Figure 5:
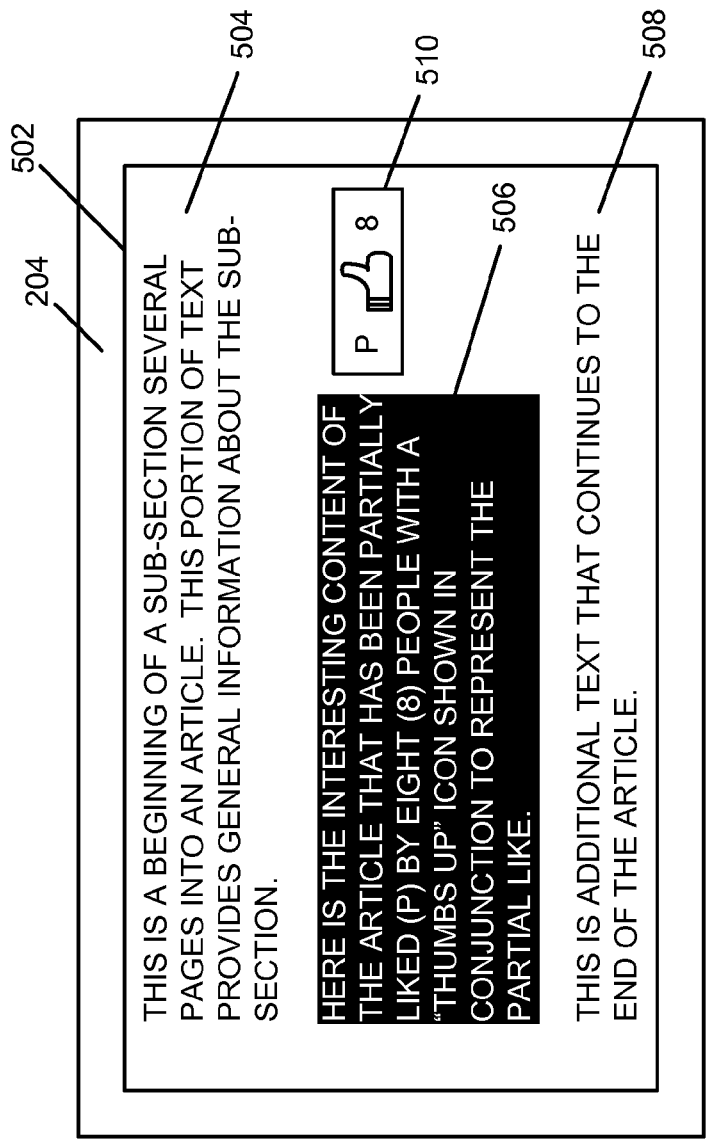
FIG. 5 is a diagram of an example of an implementation of a graphical user interface (GUI) for partial likes of social media content according to an embodiment of the present subject matter.

FIG. 5 is a diagram of an example of an implementation of a graphical user interface (GUI) 500 for partial likes of social media content. The display 204 is illustrated and is shown with content 502 rendered. For purposes of the present description, the content 502 is presumed to be rendered within a client browser application with browser controls omitted for ease of description. Within the content 502, three sections are delineated: a beginning section 504, a partially-liked section 506, and an ending section 508.

It can be seen from FIG. 5, that the beginning section 504 is represented as a beginning of a sub-section several pages into an article. Further, the beginning section 504 is text that provides general information about the sub-section. The ending section 508 represents that this portion of the content is additional text that continues to the end of the article.

Regarding the partially-liked section 506, this partially-liked content is illustrated as highlighted within the content 502, either by use of partial-like properties or dynamic markup language modification, such that the browser either overlays the partial-like information or renders the modified markup language, respectively. Within either implementation, a partial-like icon 510 is rendered in association with the highlighted partially-liked content. The partial-like icon 510 is a graphic (again either overlay or encoded) that includes a thumbs up icon (representing like) with a text character indication (e.g., "P") of partial like of the content and a numeric indication (e.g., "8") representing a quantity of social network users that liked the specific portion of the content of the social network post.

To further the present example, processing may be performed (e.g., by the process 400) to identify, by a client browser application using partial-like properties associated with the social network content post, an identified portion of the content within the social network content post indicated with the partial-like indication. The client browser application may overlay a graphic partial-like image with a count of a number of social network users that also liked the particular portion of content near a rendering of the portion of the content liked by the social network user, and may highlight the portion of the content liked by the social network user to contrast the portion of the content relative to other portions of the content. The graphic partial-like image may be rendered as a thumbs up icon with a text character indication of partial like of the content and with a numeric indication representing a quantity of social network users that liked the specific portion of the content of the social network post.

As such, the GUI 500 provides detailed information that identifies portions of content that have been liked by one or more social network users. This technical processing is an improvement relative to previous technologies of page likes, and provides a level of granularity that may improve efficiency for users.

As described above in association with FIG. 1 through FIG. 5, the example systems and processes provide partial likes of social media content. Many other variations and additional activities associated with partial likes of social media content are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
    by a processor:
        identifying a portion of content within a social network content post of a social network hosted by a social network server and indicated as liked by a social network user responsive to receiving an indication from the social network user that the social network user likes the portion of the content within the social network content post;
        generating a partial-like indication that facilitates rendering of a pop-up partial-like graphic icon (1) as an added content data element within the content of the social network content post and (2) near the portion of the content within the social network content post on the social network; and
        providing the content, using the generated partial-like indication, with the pop-up partial-like graphic icon rendered within the content of the social network content post and near the portion of the content within the social network content post responsive to a client browser application request to render the content, where providing the content comprises:
            highlighting the identified portion of the content within rendered content of the social network content post at a client device; and
            rendering the pop-up partial-like graphic icon near the highlighted portion within the rendered content, where the pop-up partial-like graphic icon comprises (i) a thumbs up icon, (ii) a text character "P" as an indication of a partial like of the content, and (iii) a numeric indication representing a quantity of social network users that liked the identified portion of the content of the social network content post.

2. The method of claim 1, where:
    identifying the portion of the content within the social network content post of the social network hosted by the social network server and indicated as liked by the social network user comprises:
        identifying a user content portion selection within the content responsive to a menu selection of one of a page-level like option and a partial like text menu item within a pop-up menu listing of text menu items; and
    rendering the pop-up partial-like graphic icon near the highlighted portion within the rendered content comprises:
        maintaining the partial-like indication without displaying the pop-up partial-like graphic icon until a partial-like threshold number of social network users indicate partial-likes of content that at least overlaps the identified portion of the content within the social network content post; and
        displaying the pop-up partial-like graphic icon within the content of the social network content post near the highlighted portion of the content responsive to the partial-like threshold number of social network users that have indicated the partial-likes being satisfied.

3. The method of claim 1, where:
    identifying the portion of the content within the social network content post of the social network hosted by the social network server and indicated as liked by the social network user comprises:
        programmatically inferring, using programmatic inference processing, the portion of the content within the social network content post liked by the social network user by use of eye tracking and a determination that the social network user is looking at the portion of the content within the social network content post; and
        providing, as a user feedback mechanism, the social network user with an opportunity to review, update, override, and confirm the programmatically inferred portion of the content within the social network content post; and
    where the method further comprises:
        updating, where any updates or overrides are received via the user feedback mechanism, the programmatic inference processing to programmatically learn and improve accuracy of the programmatic inference processing.

4. The method of claim 1, where generating the partial-like indication comprises:
    dynamically modifying encoding of the partial-like indication into text markup language used to render the content of the social network content post (i) at a location within the text markup language near the portion of the content and (ii) as a text reference to a graphic image of the pop-up partial-like graphic icon.

5. The method of claim 1, where generating the partial-like indication comprises:
    generating text partial-like properties that encode the partial-like indication, where the properties cause the client browser to render the pop-up partial-like graphic icon as the added content data element within the content and near the portion of the content of the social network content post; and
    associating the text partial-like properties with the social network content post.

6. The method of claim 1, where providing the content, using the generated partial-like indication, with the pop-up partial-like graphic icon rendered within the content of the social network content post and near the portion of the content within the social network content post responsive to the client browser application request to render the content comprises:
by use of text partial-like properties associated with the social network content post within the client browser application:
overlaying, onto the content of the social network content post, the pop-up partial-like graphic icon.

7. A system, comprising:
a memory; and
a processor programmed to:
identify a portion of content within a social network content post of a social network hosted by a social network server and indicated as liked by a social network user responsive to receiving an indication from the social network user that the social network user likes the portion of the content within the social network content post;
generate, within the memory, a partial-like indication that facilitates rendering of a pop-up partial-like graphic icon (1) as an added content data element within the content of the social network content post and (2) near the portion of the content within the social network content post on the social network; and
provide the content, using the generated partial-like indication, with the pop-up partial-like graphic icon rendered within the content of the social network content post and near the portion of the content within the social network content post responsive to a client browser application request to render the content, where in providing the content the processor is programmed to:
highlight the identified portion of the content within rendered content of the social network content post at a client device; and
render the pop-up partial-like graphic icon near the highlighted portion within the rendered content, where the pop-up partial-like graphic icon comprises (i) a thumbs up icon, (ii) a text character "P" as an indication of a partial like of the content, and (iii) a numeric indication representing a quantity of social network users that liked the identified portion of the content of the social network content post.

8. The system of claim 7, where:
in being programmed to identify the portion of the content within the social network content post of the social network hosted by the social network server and indicated as liked by the social network user, the processor is programmed to:
programmatically infer, using programmatic inference processing, the portion of the content within the social network content post liked by the social network user by use of eye tracking and a determination that the social network user is looking at the portion of the content within the social network content post; and
provide, as a user feedback mechanism, the social network user with an opportunity to review, update, override, and confirm the programmatically inferred portion of the content within the social network content post; and
where the processor is further programmed to:
update, where any updates or overrides are received via the user feedback mechanism, the programmatic inference processing to programmatically learn and improve accuracy of the programmatic inference processing.

9. The system of claim 7, where, in being programmed to generate the partial-like indication, the processor is programmed to:
dynamically modify encoding of the partial-like indication into text markup language used to render the content of the social network content post (i) at a location within the text markup language near the portion of the content and (ii) as a text reference to a graphic image of the pop-up partial-like graphic icon.

10. The system of claim 7, where, in being programmed to generate the partial-like indication, the processor is programmed to:
generate text partial-like properties that encode the partial-like indication, where the properties cause the client browser to render the pop-up partial-like graphic icon as the added content data element within the content and near the portion of the content of the social network content post; and
associate the text partial-like properties with the social network content post.

11. The system of claim 7, where, in being programmed to provide the content, using the generated partial-like indication, with the pop-up partial-like graphic icon rendered within the content of the social network content post and near the portion of the content within the social network content post responsive to the client browser application request to render the content, the processor is programmed to:
by use of text partial-like properties associated with the social network content post within the client browser application:
overlay, onto the content of the social network content post, the pop-up partial-like graphic icon.

12. A computer program product, comprising:
a computer readable storage medium having computer readable program code embodied therewith, where the computer readable storage medium is not a transitory signal per se, and where the computer readable program code when executed on a computer causes the computer to:
identify a portion of content within a social network content post of a social network hosted by a social network server and indicated as liked by a social network user responsive to receiving an indication from the social network user that the social network user likes the portion of the content within the social network content post;
generate a partial-like indication that facilitates rendering of a pop-up partial-like graphic icon (1) as an added content data element within the content of the social network content post and (2) near the portion of the content within the social network content post on the social network; and
provide the content, using the generated partial-like indication, with the pop-up partial-like graphic icon rendered within the content of the social network content post and near the portion of the content within the social network content post responsive to a client browser application request to render the content, where in causing the computer to provide the content, the computer readable program code when executed on the computer causes the computer to:

highlight the identified portion of the content within rendered content of the social network content post at a client device; and render the pop-up partial-like graphic icon near the highlighted portion within the rendered content, where the pop-up partial-like graphic icon comprises (i) a thumbs up icon, (ii) a text character "P" as an indication of a partial like of the content, and (iii) a numeric indication representing a quantity of social network users that liked the identified portion of the content of the social network content post.

13. The computer program product of claim 12, where:

in causing the computer to identify the portion of the content within the social network content post of the social network hosted by the social network server and indicated as liked by the social network user, the computer readable program code when executed on the computer causes the computer to:

identify a user content portion selection within the content responsive to a menu selection of one of a page-level like option and a partial like text menu item within a pop-up menu listing of text menu items; and in causing the computer to render the pop-up partial-like graphic icon near the highlighted portion within the rendered content, the computer readable program code when executed on the computer causes the computer to:

maintain the partial-like indication without displaying the pop-up partial-like graphic icon until a partial-like threshold number of social network users indicate partial-likes of content that at least overlaps the identified portion of the content within the social network content post; and display the pop-up partial-like graphic icon within the content of the social network content post near the highlighted portion of the content responsive to the partial-like threshold number of social network users that have indicated the partial-likes being satisfied.

14. The computer program product of claim 12, where:

in causing the computer to identify the portion of the content within the social network content post of the social network hosted by the social network server and indicated as liked by the social network user, the computer readable program code when executed on the computer causes the computer to:

programmatically infer, using programmatic inference processing, the portion of the content within the social network content post liked by the social network user by use of eye tracking and a determination that the social network user is looking at the portion of the content within the social network content post; and provide, as a user feedback mechanism, the social network user with an opportunity to review, update, override, and confirm the programmatically inferred portion of the content within the social network content post; and where the computer readable program code when executed on the computer further causes the computer to:

update, where any updates or overrides are received via the user feedback mechanism, the programmatic inference processing to programmatically learn and improve accuracy of the programmatic inference processing.

15. The computer program product of claim 12, where, in causing the computer to generate the partial-like indication, the computer readable program code when executed on the computer causes the computer to:

dynamically modify encoding of the partial-like indication into text markup language used to render the content of the social network content post (i) at a location within the text markup language near the portion of the content and (ii) as a text reference to a graphic image of the pop-up partial-like graphic icon.

16. The computer program product of claim 12, where, in causing the computer to generate the partial-like indication, the computer readable program code when executed on the computer causes the computer to:

generate text partial-like properties that encode the partial-like indication, where the properties cause the client browser to render the pop-up partial-like graphic icon as the added content data element within the content and near the portion of the content of the social network content post; and associate the text partial-like properties with the social network content post.

17. The computer program product of claim 12, where, in causing the computer to provide the content, using the generated partial-like indication, with the pop-up partial-like graphic icon rendered within the content of the social network content post and near the portion of the content within the social network content post responsive to the client browser application request to render the content, the computer readable program code when executed on the computer causes the computer to:

by use of text partial-like properties associated with the social network content post within the client browser application:

overlay, onto the content of the social network content post, the pop-up partial-like graphic icon.

* * * * *